US012621734B2

(12) United States Patent
Hassan et al.

(10) Patent No.: US 12,621,734 B2
(45) Date of Patent: May 5, 2026

(54) SPEAKER SELECTION IN CALLING AND CONFERENCING

(71) Applicant: Microsoft Technology Licensing, LLC, Redmond, WA (US)

(72) Inventors: Amer Aref Hassan, Kirkland, WA (US); Philip Ibo Ibrahima Drammeh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 18/529,456

(22) Filed: Dec. 5, 2023

(65) Prior Publication Data

US 2025/0184839 A1      Jun. 5, 2025

(51) Int. Cl.
| | |
|---|---|
| *H04M 1/72454* | (2021.01) |
| *G06F 3/16* | (2006.01) |
| *H04M 1/60* | (2006.01) |
| *H04R 3/12* | (2006.01) |
| *H04W 36/00* | (2009.01) |
| *H04W 36/32* | (2009.01) |

(52) U.S. Cl.
CPC .......... *H04W 36/035* (2023.05); *G06F 3/165* (2013.01); *H04M 1/605* (2013.01); *H04M 1/72454* (2021.01); *H04R 3/12* (2013.01); *H04W 36/326* (2023.05); *H04R 2420/07* (2013.01)

(58) Field of Classification Search
CPC ... H04W 36/035; H04W 36/326; G06F 3/165; H04M 1/605; H04M 1/72454; H04R 3/12; H04R 2420/07
USPC ........................................................ 455/437
See application file for complete search history.

(56) References Cited

U.S. PATENT DOCUMENTS

| | | | |
|---|---|---|---|
| 10,917,060 B2 * | 2/2021 | Mehta ...................... | H03G 3/32 |
| 2012/0027216 A1 * | 2/2012 | Tirry ................... | H04M 19/044 |
| | | | 381/57 |
| 2017/0125037 A1 * | 5/2017 | Shin ......................... | G10L 15/20 |
| 2020/0336958 A1 * | 10/2020 | Sridhara ............. | H04W 36/035 |
| 2024/0184510 A1 * | 6/2024 | S ............................... | H04B 5/70 |

* cited by examiner

*Primary Examiner* — Don N Vo
(74) *Attorney, Agent, or Firm* — Workman Nydegger

(57) ABSTRACT

Systems and methods are provided for managing audio device handover in a communication system. The decision whether to handover a call from one acoustic assembly to a candidate handover acoustic assembly during the call is based, at least in part, on a determined power ratio associated with the candidate handover acoustic assembly. In this manner, the handover is based on a corresponding likelihood that a user on the call has moved into an acoustic proximity to the candidate handover acoustic assembly rather than simply being based on a physical distance of a user relative to the candidate handover acoustic assembly or signal strength between the user's device and the candidate handover acoustic assembly.

20 Claims, 12 Drawing Sheets

1000

Transducer (Microphone)

Transducer (Speaker)

Acoustic Assembly 110

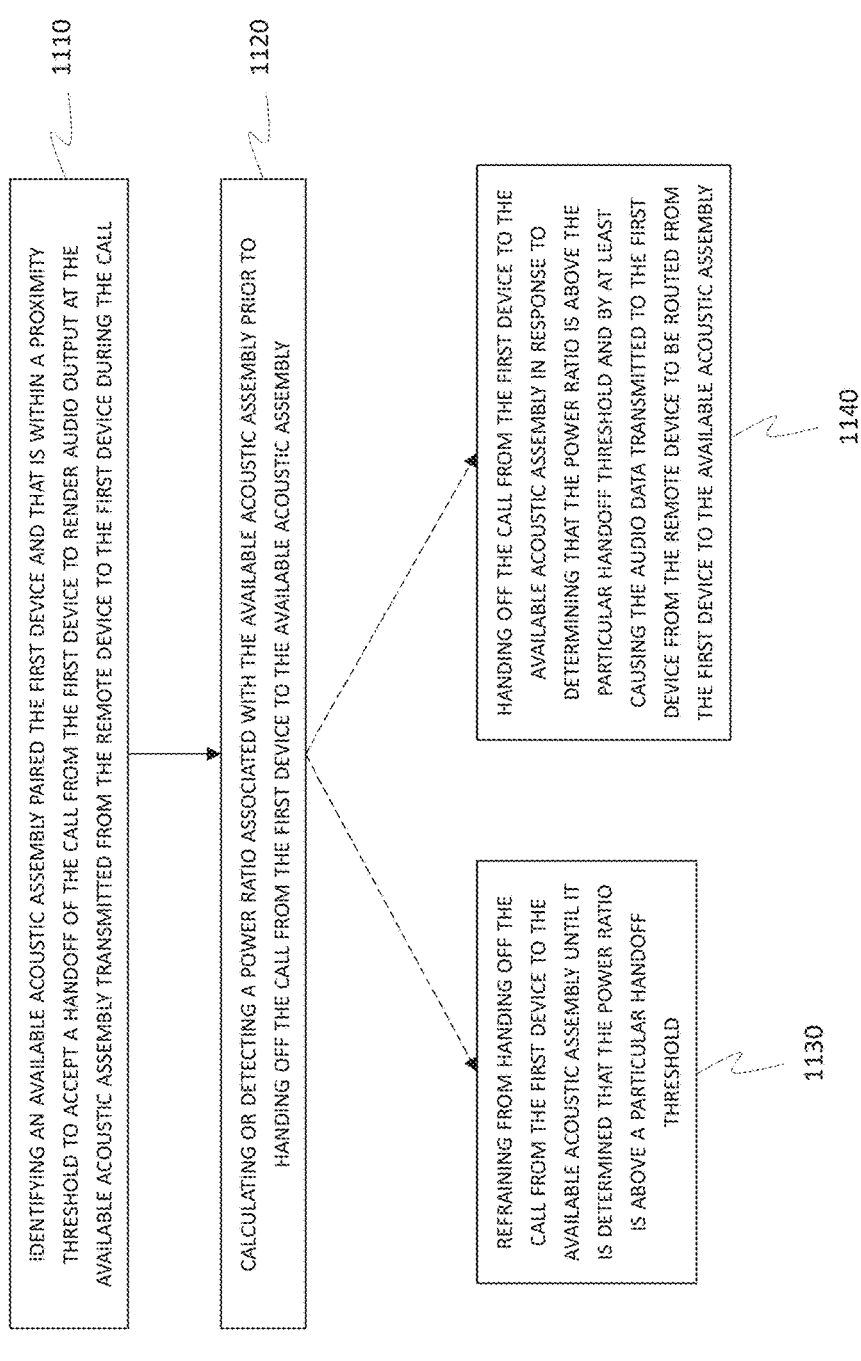

1100

IDENTIFYING AN AVAILABLE ACOUSTIC ASSEMBLY PAIRED THE FIRST DEVICE AND THAT IS WITHIN A PROXIMITY THRESHOLD TO ACCEPT A HANDOFF OF THE CALL FROM THE FIRST DEVICE TO RENDER AUDIO OUTPUT AT THE AVAILABLE ACOUSTIC ASSEMBLY TRANSMITTED FROM THE REMOTE DEVICE TO THE FIRST DEVICE DURING THE CALL — 1110

CALCULATING OR DETECTING A POWER RATIO ASSOCIATED WITH THE AVAILABLE ACOUSTIC ASSEMBLY PRIOR TO HANDING OFF THE CALL FROM THE FIRST DEVICE TO THE AVAILABLE ACOUSTIC ASSEMBLY — 1120

REFRAINING FROM HANDING OFF THE CALL FROM THE FIRST DEVICE TO THE AVAILABLE ACOUSTIC ASSEMBLY UNTIL IT IS DETERMINED THAT THE POWER RATIO IS ABOVE A PARTICULAR HANDOFF THRESHOLD — 1130

HANDING OFF THE CALL FROM THE FIRST DEVICE TO THE AVAILABLE ACOUSTIC ASSEMBLY IN RESPONSE TO DETERMINING THAT THE POWER RATIO IS ABOVE THE PARTICULAR HANDOFF THRESHOLD AND BY AT LEAST CAUSING THE AUDIO DATA TRANSMITTED TO THE FIRST DEVICE FROM THE REMOTE DEVICE TO BE ROUTED FROM THE FIRST DEVICE TO THE AVAILABLE ACOUSTIC ASSEMBLY — 1140

Figure 11

SPEAKER SELECTION IN CALLING AND CONFERENCING

BACKGROUND

In modern communication systems, audio devices such as mobile phones, headsets, car audio systems, and desk speakers are often used interchangeably during a single call or audio session. This is facilitated by technologies such as Bluetooth, which allow these devices to be paired and communicate with each other wirelessly. The ability to switch or handover the audio communication from one device to another can provide flexibility and convenience to the user.

For instance, a user may start a call on their mobile phone, then switch to a headset for hands-free operation, and later transfer the call to a speaker when they reach their office. This process of transferring audio communication from one device to another is commonly referred to as 'handover'.

The decision to handover the audio communication is typically based on various factors such as the proximity of the devices, the strength of the wireless connection, and user preferences. In many systems, the handover process is automated, with the system managing the call or the user's handheld device deciding when and where to handover based on these factors.

One common method for determining when to handover is based on the signal strength or proximity of the devices. For example, when a user's mobile phone comes within range of a paired speaker, the system may automatically handover the audio communication from the phone to the speaker. This is often done without any input from the user, and the handover can occur even if the user is in the middle of a call.

Another factor that can influence the handover decision is the audio quality or power ratio of the devices. The power ratio is a measure of the audio power being output by the device (e.g., the speaker) compared to the audio power being input to the device (e.g., the microphone). This ratio can provide an indication of the audio quality and can be used to decide whether to handover the audio communication to a different device.

While these methods can provide a degree of automation and convenience, they also have limitations and can sometimes lead to undesirable handovers. For example, a handover may occur unexpectedly during a call, causing a disruption in the audio communication, such as when a user is conducting a call through their car audio system and they approach their house or office.

When they get close enough, the call may automatically be handed over to the home/office speaker, effectively cutting the user off from the call while they remain in their car. It may also take several seconds before the user realizes they have been cut from the call. By that time, the flow of the conversation has been broken. Then, the user may need to reconnect to their desired speaker and extend the call to catch up on what was missed. The processes and time required to do this can degrade the user experience and also represent wasted computing resources.

In view of at least the foregoing, it should be apparent that there exists an ongoing need and desire for improved systems and methods for facilitating and managing speaker selection during calls and conferencing.

SUMMARY

The techniques described herein relate to computer-implemented methods and corresponding systems for facilitating and managing speaker selection during calls and conferencing.

The disclosed embodiments include systems and methods for managing audio device handover in a communication system during call sessions and conferencing. The decision whether to handover a call from one acoustic assembly to a candidate handover acoustic assembly during the call session/conference is based, at least in part, on a determined power ratio associated with the candidate handover acoustic assembly. In this manner, the handover is based on a corresponding likelihood that a user has moved into an acoustic proximity to the candidate handover acoustic assembly during the call rather than simply being based on a physical distance of a user relative to the candidate handover acoustic assembly or signal strength between the user's device and the candidate handover acoustic assembly.

In some aspects, the techniques described herein relate to a method for managing audio device handover in a communication system, wherein the method includes: during a call between a remote device and a first acoustic assembly, calculating a power ratio associated with a second acoustic assembly for determining whether to handover the call from the first acoustic assembly to the second acoustic assembly; the power ratio being calculated by (i) identifying a generated current that is generated at the second acoustic assembly by ambient sound modulating an audio transceiver at the second acoustic assembly, and (ii) dividing the generated current by a required current associated with modulating a speaker at the second acoustic assembly to render the call at the second acoustic assembly; comparing the calculated power ratio with a predetermined system threshold; and based on the comparison, deciding whether to handover the audio communication from the first acoustic assembly to the second acoustic assembly.

In some aspects, the first acoustic assembly is a mobile phone or a first device paired with a mobile phone receiving the call from the remote device and the second acoustic assembly is a second device paired with the mobile phone.

In some aspects, the techniques described herein relate to a method implemented by a computing system managing a handover of a call from a first state in which the call occurs between a remote device and a first device to second state in which the call occurs between the remote device and an acoustic assembly paired with the first device, wherein the method includes: identifying an available acoustic assembly that is paired the first device and that is within a proximity threshold to accept a handoff of the call from the first device to render audio output at the available acoustic assembly that is transmitted from the remote device to the first device during the call; prior to handing off the call from the first device to the available acoustic assembly, detecting a power ratio of (i) power associated with ambient noise modulating electric current at the available acoustic assembly and (ii) power associated with current for modulating the acoustic assembly to render audio output corresponding to audio data transmitted from the remote device; refraining from handing off the call from the first device to the available acoustic assembly until it is determined that the power ratio is above a particular handoff threshold; and handing off the call from the first device to the available acoustic assembly in response to determining that the power ratio is above the particular handoff threshold and by at least causing the audio data transmitted to the first device from the remote device to be routed from the first device to the available acoustic assembly.

In some aspects, the method further includes: determining whether the power ratio is above a notification threshold and below the particular handoff threshold; and upon determining the power ratio is above the notification threshold and below the particular handoff threshold, providing the user a query prompt about whether the call should be handed off from the first device to the available acoustic assembly and handing the call off from the first device to the available acoustic assembly in response to receiving a user input responsive to the query prompt.

In some embodiments, the first device is a mobile phone and the available acoustic assembly is a speaker.

In some aspects, the particular handoff threshold is an adjustable threshold and the method further includes receiving input from the user for adjusting the threshold.

In some aspects, the method further includes detecting the power ratio by detecting a change in the power ratio over a predetermined time and wherein handing off the call from the first device to the available acoustic assembly only occurs upon determining the change in the power ratio over the predetermined time includes an increase in the power ratio of at least a predetermined percentage.

In some aspects, the method further includes: determining whether the power ratio has been calculated to be above a first threshold and below the particular handoff threshold for a predetermined duration of time; and upon determining the power ratio has been calculated to be above a first threshold and below the particular handoff threshold for the predetermined duration of time, providing the user a query prompt about whether the call should be handed off from the first device to the available acoustic assembly.

In some aspects, the method further includes refraining from handing off the call from the first device to the available acoustic assembly until it is determined that the power ratio has remained above the particular handoff threshold for a predetermined duration of time.

In some aspects, the techniques described herein relate to a system for managing audio device handover in a communication system, the system including: one or more processors; and one or more hardware storage devices having stored computer-executable instructions that are executable by the one or more processors for causing the system to perform the following: receive a signal from a first audio device and a second audio device; calculate a power ratio based on the received signals, wherein the power ratio is a current being modulated by audio at the second audio device divided by a current associated with modulating audio at the second audio device; compare the calculated power ratio with a predetermined system threshold; and based on the comparison, determine when to handover the audio communication from the first audio device to the second audio device.

As noted earlier, the first audio device may be a mobile phone and the second audio device may be a speaker or any other device that includes a speaker.

In some aspects, the system, prior to handing over the audio communication to the second audio device, prompts the user to confirm that the handover should occur upon determining that the calculated power ratio is at least as great as the predetermined system threshold.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIGS. 10-11 illustrate flowcharts of acts associated with exemplary methods for managing calling and call handover events.

DETAILED DESCRIPTION

Figure 1:
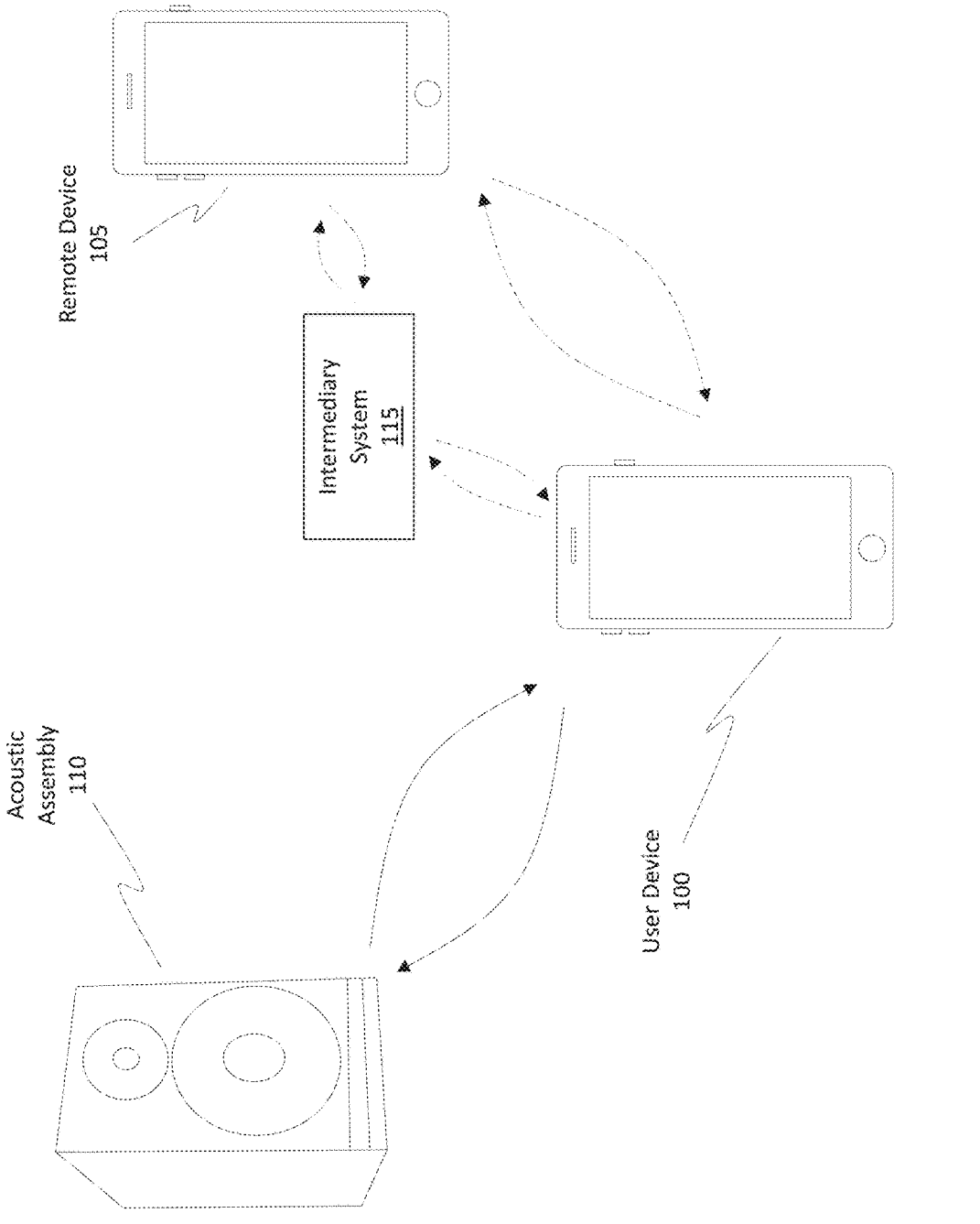
FIG. 1 illustrates examples of acoustic assemblies and an environment in which the acoustic assemblies are used for facilitating calling.

Systems and methods are provided for managing and facilitating the selection of speakers and other acoustic assemblies during calling and conferencing sessions.

As noted above, the management of audio device handover during a calling session can present challenges for conventional audio systems, particularly when a user is engaged in a call and the call is unexpectedly transferred to another audio device during the call without the user's knowledge or consent. This situation can occur, for example, when a user's mobile phone is paired with multiple audio devices, such as a car audio system, a headset, and a desk mini speaker. During a call with conventional systems, in such scenarios, the user's mobile phone may automatically handover the call to another paired audio device based on determined physical proximity of the user to a new device, irrespective of whether the user is within acoustic proximity to that device, thereby disrupting the user's call experience.

In instances, a first acoustic assembly involved in a calling session may be the user's mobile phone that is connected in a call with a remote device and that receives audio data from the remote device. The first acoustic assembly may be a first device (e.g., car audio system or headset) that is paired with the user's mobile phone. During the call or calling session, the disclosed systems determine whether to handover the call from the first acoustic assembly to a second acoustic assembly (e.g., by at least transmitting the audio data received from the remote device to the second acoustic assembly). The second acoustic assembly, to which the call may be handed over, could be a second device also paired with the mobile phone. For instance, the first device could be a mobile phone that the user is currently using for the call, and the second device could be a desk mini speaker in the user's office or home that the mobile phone is also paired with.

In other use cases, the first acoustic assembly could be the mobile phone itself receiving the call from the remote device, and the second acoustic assembly could be any device paired with the mobile phone. For example, the user could be on a call using the mobile phone, and the call could be handed over to a car audio system that the mobile phone is paired with when the user enters the car.

In both scenarios, the unexpected handover of the call from the first acoustic assembly to the second acoustic assembly can disrupt the user's call experience, as the user may not realize immediately that the call has been transferred to another device. This can result in moments of silence during the call, confusion, and potential miscommunication between the user and the remote device. As noted earlier, these issues can degrade the user's experience and result in wasted resources needed to address the break in communications and to get reconnected.

To address these technical problems, disclosed systems and methods are provided for more intelligently managing audio device handover in communication systems. The disclosed methods and systems can be utilized to provide practical benefits and technical solutions to the foregoing technical problems. In particular, the disclosed embodiments can be used to prevent the call from being handed over from one device to another device until/unless it is likely that the user is in the actual acoustic presence/proximity of the new acoustic assembly without relying merely on proximity determinations made solely on signal strength and/or positioning information, like conventional systems, and which may make false positive determinations regarding the user's proximity to the acoustic assemblies (e.g., when the user is separated from the new acoustic assembly by a wall, car structure or other barrier, even though the user is technically close to the new acoustic assembly in terms of absolute physical position).

According to the disclosed embodiments, a determination is made during the call between a remote device and a first acoustic assembly whether to handover the call from the first acoustic assembly to a second acoustic assembly. This determination is based on a power ratio calculated in part on a current or other power metric modulated or generated at the second acoustic assembly relative to a predetermined threshold and/or relative to a change over time. This power ratio will change, due to modulations caused by changes in the ambient noise surrounding the second acoustic assembly, such as when the user is speaking during the call in the presence of the second acoustic assembly.

In some instances, the power ratio is calculated by identifying a generated current that is generated at the second acoustic assembly by ambient sound modulating an audio transceiver at the second acoustic assembly, and dividing the generated current by a current associated with modulating a speaker at the second acoustic assembly to render the call at the second acoustic assembly. For instance, a user speaking in the presence of a speaker will cause the speaker to vibrate and cause relative movement of wires and/or magnetic components in the speaker. This generates a modulated or generated current that can be measured. In this regard, the speaker operates as an acoustic transducer or microphone.

When the acoustic assembly includes a microphone, the modulated or generated current that is created when the user speaks in the presence of the acoustic assembly can be measured by amp meters or other sensors attached to the microphone and/or the speaker.

The current that is associated with modulating the speaker at the second acoustic assembly can be estimated based on known attributes of the second acoustic assembly and the audio data that is being transmitted during the call. For instance, by way of one non-limiting example, many Bluetooth speakers will use around (2 mA) of current (I) during use, or around 0.1 W (Watt of power) at 5 V (Volts), where $W = V \times I$.

By calculating a power ratio for an acoustic assembly based on the modulated or generated current at that acoustic assembly, relative to the current associated with modulating the speaker at that acoustic assembly (either as a snapshot ratio and/or as a relative change over time), it is possible to determine, with greater accuracy than conventional systems, whether the user is actually in the presence of the second acoustic assembly and not just within a certain proximity to the second acoustic assembly prior to handing over a call to the acoustic assembly. For instance, as noted previously, the physical proximity of a user to a device does not mean they are necessarily within acoustic proximity to the device, such as when the user may be acoustically separated from the acoustic assembly by a wall, car structure and/or other barrier(s). Using the referenced power ratio, it is possible to address this disconnect that is not addressed by conventional systems.

According to disclosed embodiments, the calculated power ratio is compared with one or more predetermined system thresholds that are set according to likelihoods that the user is within a physical proximity, as well as an acoustic presence, of the second acoustic assembly. These predetermined system thresholds can be set according to testing to correspond with different preferences and likelihoods that a user is within the acoustic presence and proximity of an acoustic assembly before a handover occurs.

Based on the comparison of the power ratio to the predetermined thresholds, a decision is made whether to handover the audio communication from the first acoustic assembly to the second acoustic assembly. For instance, if the power ratio is less than the system threshold, it is decided that the user is not in audio proximity to the second acoustic assembly, and the call is not handed over. If the power ratio is greater than the system threshold, the call is handed over to the second acoustic assembly.

In some instances, the user can also be prompted to confirm whether the handover should occur prior to the handover actually occurring. Such a prompt to the user can be generated in response to determining that the power ratio is equal to or greater than a particular predetermined system prompt generation threshold. For instance, the system may determine whether the power ratio is above a first threshold (the prompt generation threshold) and below a different threshold (e.g., a predetermined handoff threshold). If the power ratio is determined to be above the first threshold and below the particular handoff threshold, the system may provide the user with a query prompt about whether the call should be handed off from the first device to the available acoustic assembly. This provides the user with the opportunity to confirm or deny the handover before it occurs, giving the user more control over the call experience.

In some instances, additionally or alternatively, when the power ratio meets or exceeds the predetermined handoff threshold, the system will automatically trigger the handover of the call from the first acoustic assembly to the second acoustic assembly. This may be done, for instance, without generating a prompt to the user. Instead, a notification may be generated to the user that the handoff has occurred so that, if it was undesired, the user can more promptly react than is possible with conventional systems. The notification can be, for example, an audible message played to the user that the handoff has occurred and/or a visual notification presented on the user's mobile device.

In some instances, the predetermined handoff threshold and/or the prompt generation threshold may be an adjustable threshold. This allows the system to be customized to suit the user's preferences and can help to improve the user's call experience.

In some cases, the system may receive input from the user for adjusting the threshold. This allows the user to have control over the handover process and can help to prevent unexpected handovers that could disrupt the user's call experience. The input can be received, for example, from an interface menu that presents selectable threshold presets to the user with a description of relative likelihood a user is within acoustic proximity to a new acoustic assembly before the handover will occur and/or a notification will be generated.

In some cases, the system may also monitor and detect a change in the power ratio of a particular new speaker or other acoustic assembly that may be handed over a call during a predetermined time before a handover occurs. This embodiment allows the system to monitor the power ratio and can help to prevent unexpected handovers that could disrupt the user's call experience. To prevent undesired computational expense for monitoring and determining this change in power ratio for one or more candidate acoustic assemblies, the system may refrain from determining a power ratio and a change in power ratio for a candidate acoustic assembly until it is determined that the user is within a predetermined proximity to the candidate acoustic assembly/assemblies during a call. This can be done, for example, using conventional techniques for monitoring proximity based on position data and/or signal strength detected by the user's mobile phone relative to the different acoustic assemblies.

In some cases, the system may hand off the call from the first device to the available acoustic assembly only upon determining that the change in the power ratio over the predetermined time comprises an increase in the power ratio of at least a predetermined percentage. This allows the system to handover the call based on changes in the power ratio, which can help to improve the user's call experience.

In some cases, the predetermined time may comprise a period of less than a minute (e.g., a few seconds (1-10 seconds) or many seconds (10-60 seconds)) or more than a minute. This allows the system to track changes in the acoustic proximity of the user and quickly respond to changes in the power ratio when the user enters acoustic proximity to new acoustic assemblies, while still helping to prevent unexpected handovers that could disrupt the user's call experience.

In some cases, the change in the power ratio over the predetermined time may comprise an increase in the power ratio of at least 5% or 10%. This allows the system to handover the call based on specific changes in the power ratio, which can help to improve the user's call experience.

In some cases, the system may determine whether the power ratio has been calculated to be above a first threshold and below the particular handoff threshold for a predetermined duration of time. If the power ratio has been calculated to be above the first threshold and below the particular handoff threshold for the predetermined duration of time, the system may provide the user with a query prompt about whether the call should be handed off from the first device to the available acoustic assembly. This provides the user with the opportunity to confirm or deny the handover before it occurs, giving the user more control over the call experience.

In some cases, the system may refrain from handing off the call from the first device to the available acoustic assembly until it is determined that the power ratio has remained above the particular handoff threshold for a predetermined duration of time (e.g., a few seconds). This allows the system to ensure that the power ratio is consistently above the particular handoff threshold before handing over the call, which can help to prevent unexpected handovers that could disrupt the user's call experience when the user is simply walking past a candidate handoff assembly only momentarily (e.g., walking through a room with the candidate handoff assembly, or walking in and out of a room quickly to pick something up).

In some cases, the system may identify multiple candidate acoustic assemblies that the call could be handed over to (e.g., different speakers within a single room the user has walked into). When this happens, the system may notify the user of all of the different options and only make the handover when the user selects one of the options. Alternatively, the system may automatically select the candidate assembly that has the highest power ratio and/or the greatest relative change in the power ratio (e.g., a speaker that the user is most likely to be standing closest to).

The system that determines whether to handover the call may be the user's mobile device or other primary device that is receiving the audio data from the remote device during the call. Alternatively, the system may be a separate computing system that implements a call management service interposed between the user's mobile phone and the remote device participating in the call. In this alternative embodiment, the separate computing system and/or the user's mobile phone may gather and provide signals to the call management service that include and/or that are used to determine the current values used to calculate the power ratio for the different candidate handover acoustic assemblies. In these embodiments, the call management service triggers the generation of requests to the candidate acoustic assemblies to gather the necessary information to calculate the referenced power ratios.

With regard to the foregoing and following examples, it will be appreciated that the disclosed embodiments can be utilized to provide technical benefits over conventional systems by at least improving the quality of calls without undesired handovers during the calls, as well as for reducing and/or eliminating wasted time and resources associated with re-establishing call handling by user-preferences during the call. It will also be noted that while many references are made regarding a call (e.g., a telephone voice call) from a single remote caller device to a user's device (e.g., a mobile phone), the disclosed embodiments also apply to multiuser scenarios, such as video calls and conference calls.

Attention is now directed to FIG. 1, which illustrates an example of a communication session (e.g., a call) between user device 100 (e.g., a user's mobile phone) and a remote device 105 (e.g., a third-party mobile phone). This communication session can be a voice-only call or a video call. It can also include conferencing with multiple callers (although only two are shown).

The user, using user device 100, can talk with one or more remote third-party entities at corresponding remote device (s) 105 through a microphone that is part of the user device 100. The user can also hear audio transmitted from the one or more remote third-party entities through a speaker that is also part of the user device 100. One or more intermediary system(s) 115 may also be used to facilitate and manage the calling session between the different devices.

During the call session (also referred to herein as a call), a handover of the call from the user device 100 to a different/candidate acoustic assembly 110 (e.g., a Bluetooth enabled speaker system paired with the user device 100) may occur. In conventional systems, this handoff occurs when the signal strength (e.g., Bluetooth signal) between the user device 100 and the acoustic assembly 110 reaches a predetermined signal threshold according to rules implemented by the user device or intermediary systems.

In the disclosed embodiments, the handover is conditionally based at least in part on a power ratio associated with the acoustic assembly 110. Although the acoustic assembly 110 is shown as only a single discrete system, the acoustic assembly 110 may actually be a distributed system and/or include a plurality of different acoustic assemblies (not shown). During a handover, the call may be handed over to one or more of the acoustic assemblies according to the disclosed embodiments described herein.

Figure 2:
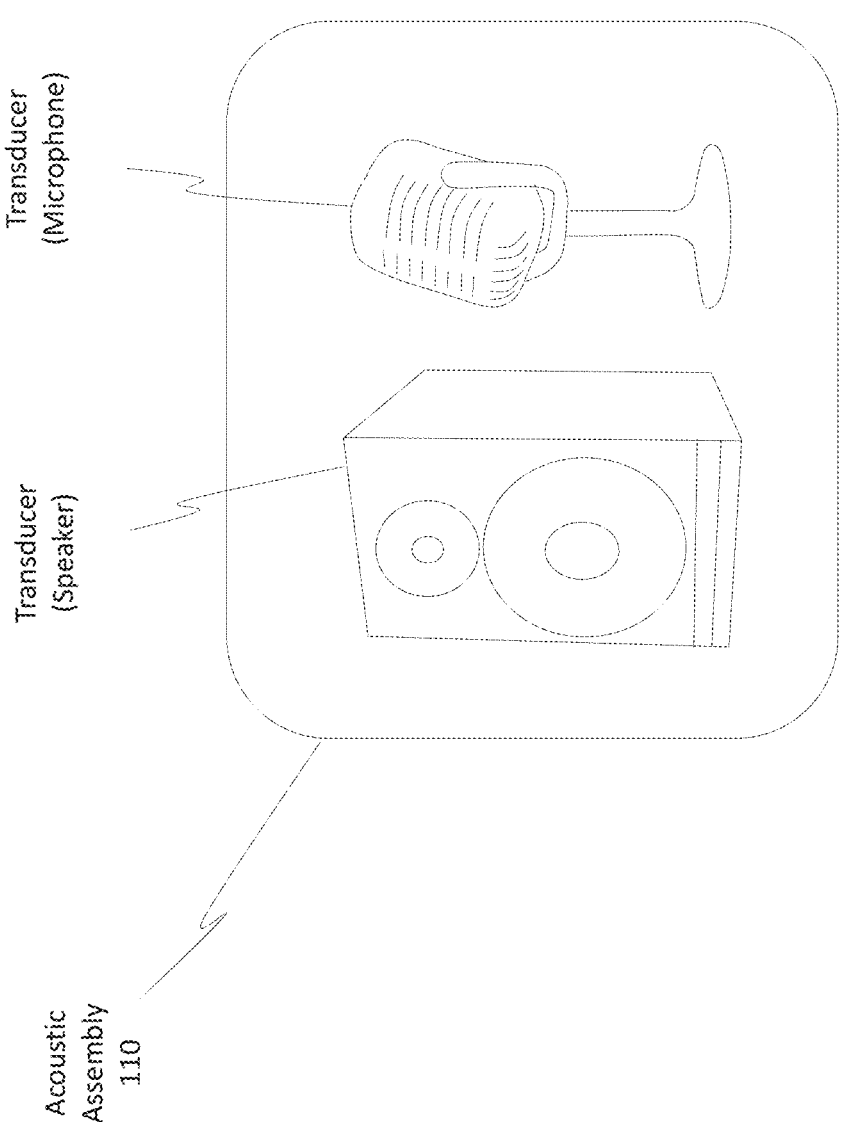
FIG. 2 illustrates elements of an acoustic assembly.

As described, the power ratio of an acoustic system is based at least in part on a generated or modulated current detected at the acoustic system 115. FIG. 2 illustrates how an acoustic assembly may include one or more transducer, referred to herein as a speaker transducer and optionally a separate microphone transducer. A speaker transducer typically converts current received at the transducer into movement of speaker elements (e.g., by passing current through wires coiled around a magnet and thereby causing vibrations of the speaker elements connected to either the wires or magnet). These features are not shown, as they are well known to those of skill in the art.

In contrast, a microphone transducer modulates or otherwise generates current in response to wire elements coiled around a magnet in the microphone transducer being moved relative to the magnet. The movement is caused by sound waves vibrating components of the microphone transducer. The current that is generated or modulated in this manner is then measured with current sensors (e.g., amp meters) connected with the microphone and then converted into a digital signal representing the audio that is received at the microphone.

In this regard, it will also be appreciated that a speaker transducer can also operate as a microphone transducer when ambient sound waves vibrate the speaker elements (e.g., the speaker paper or membrane) which causes corresponding vibrations/movement of the coiled wires relative to the magnet that they are coiled around within the speaker assembly.

The speaker transducer may already include or may be equipped with a sensor capable of measuring the current that is modulated/generated by soundwaves from the ambient noise surrounding the speaker engaging the speaker elements (e.g., such as when a user walks into a room with the speaker and beings talking).

With regard to the foregoing, the speaker transducer may also operate as a microphone transducer when modulating current in response to sound waves that cause speaker elements to vibrate and move wires relative to a magnet in the speaker transducer, such as in response to ambient noise within the acoustic proximity to the speaker transducer.

Figure 3:
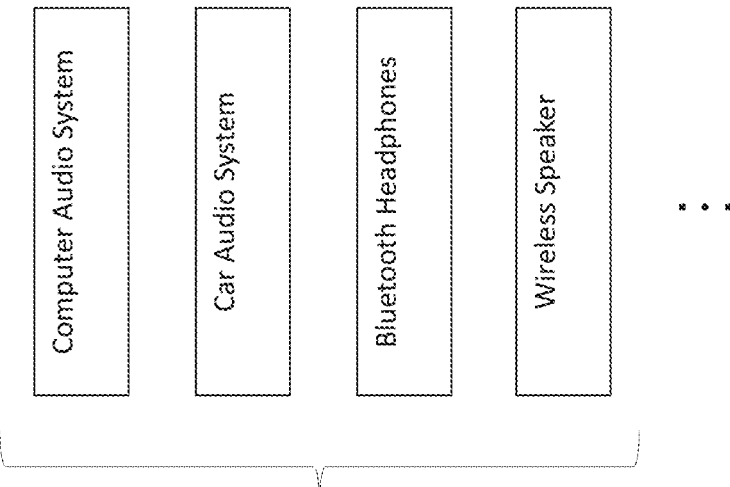
FIG. 3 illustrates types of acoustic assemblies.

FIG. 3 illustrates how the referenced acoustic assembly 110 may be one of a multitude of different types of audio devices and systems.

Figure 4:
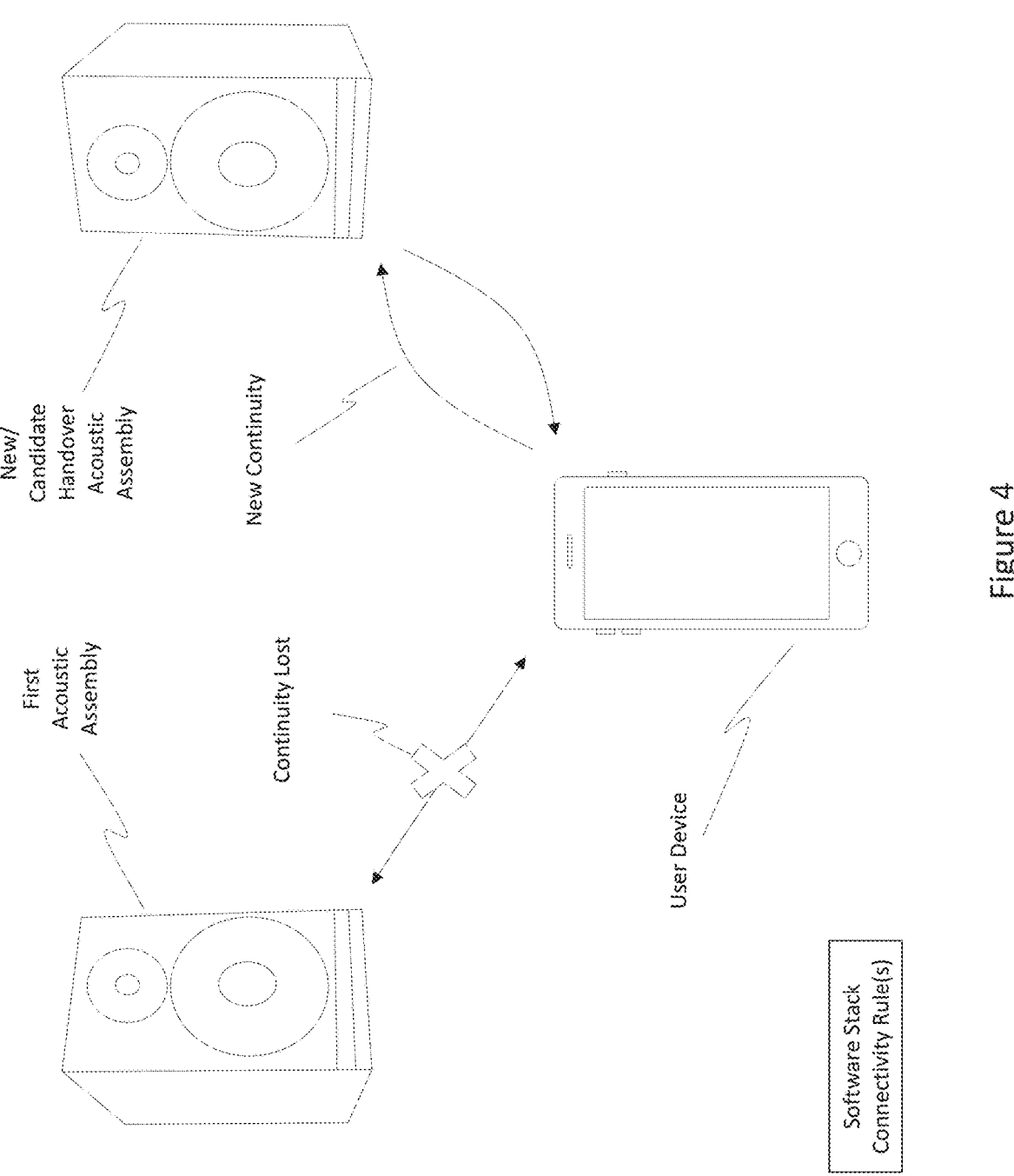
FIG. 4 illustrates a call handover event between acoustic assemblies.

FIG. 4 illustrates the implementation of connectivity rules and the handover of a call from a first acoustic assembly to a new/candidate handover acoustic assembly. As shown, the user device may have an initial continuity with one acoustic assembly (e.g., via Bluetooth connectivity). That acoustic assembly renders audio from the call received at the user device. Then, due to connectivity rules, the call can be handed over to the new candidate handover acoustic assembly, thereby terminating the continuity to the first acoustic assembly and creating a new continuity with the candidate handover acoustic assembly.

The connectivity rules can be enforced by the user device or a third-party system (not shown), which is in communication with the user device, for triggering actions required to terminate the continuity between the user device and the first acoustic assembly and to establish a new continuity with the new/candidate handover acoustic assembly.

As described herein, the connectivity rules can be based at least in part on a determined power ratio associated with the new/candidate handover acoustic assembly. In some embodiments, the enforcement of the disclosed connectivity rules is triggered or otherwise initiated based on a determination that the user device is withing a predetermined proximity to or has detected a predetermined signal strength of a candidate acoustic assembly.

Figure 5:
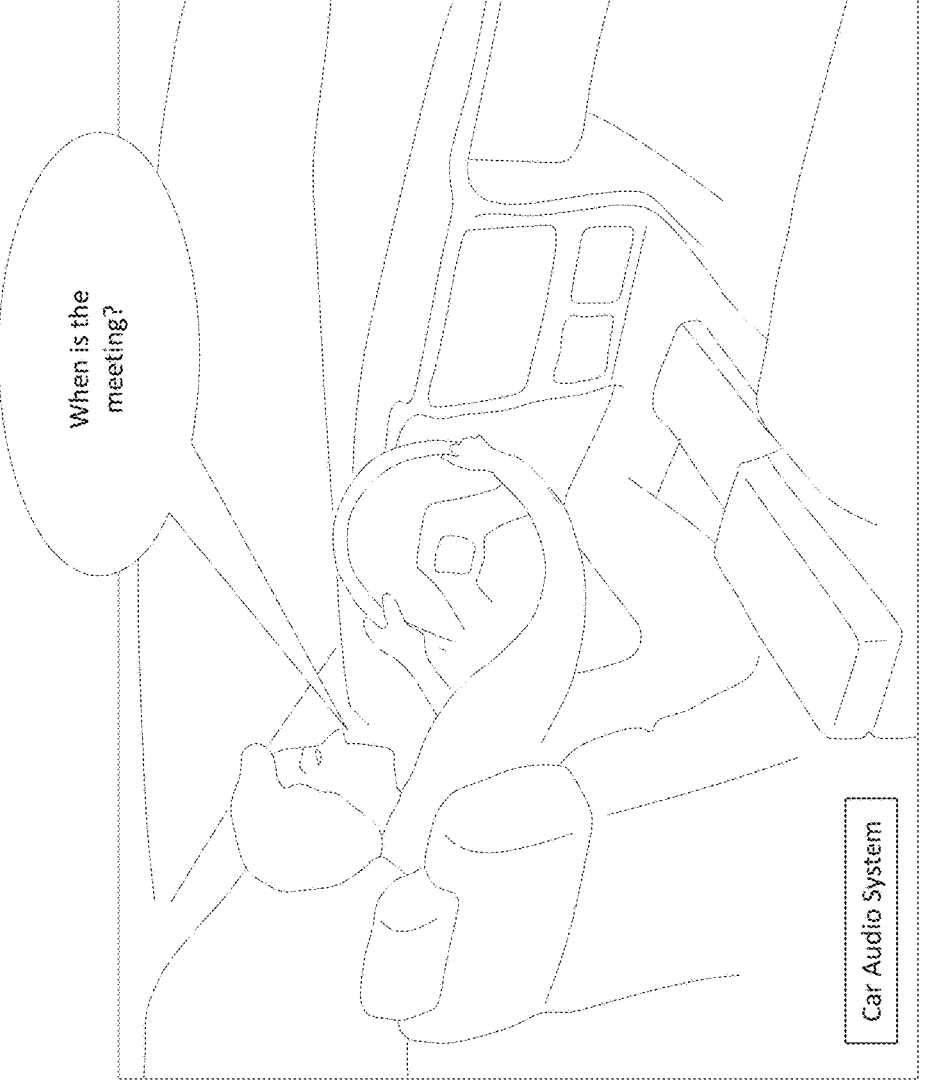
FIGS. 5-7 illustrate a scenario involving a call handover event from a car audio system to a home or office audio system.
Figure 6:
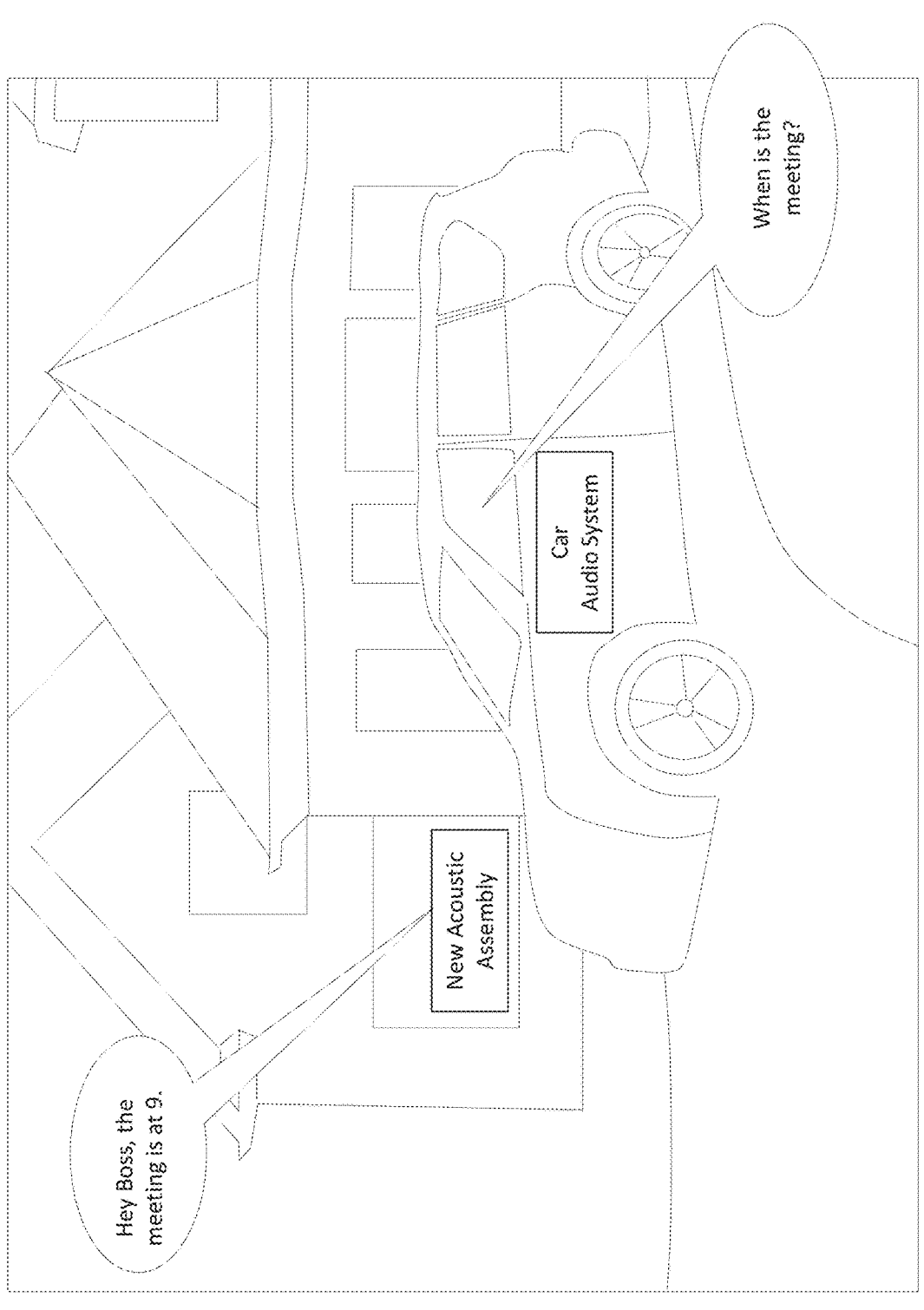
Figure 7:
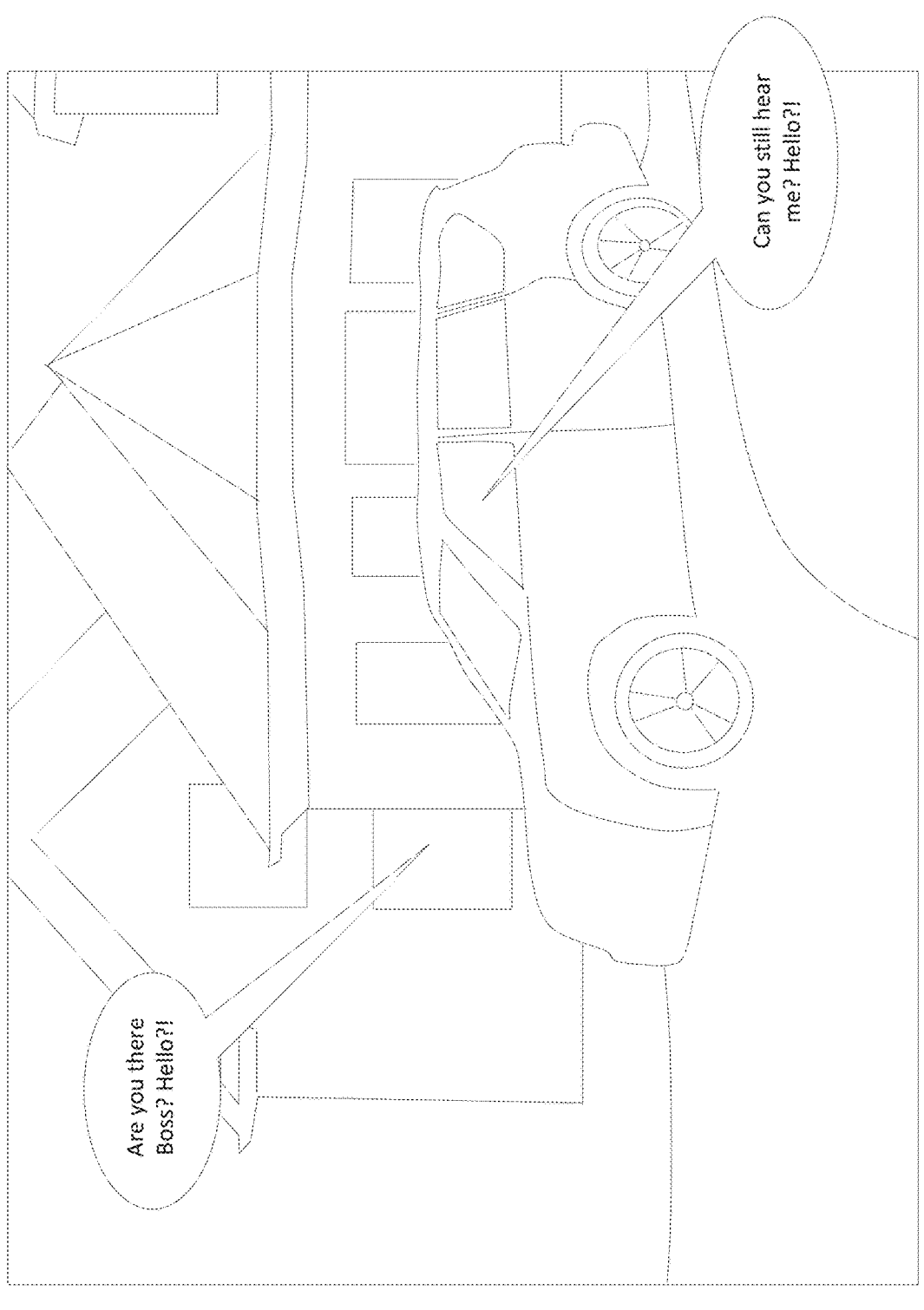

FIGS. 5-7 illustrate a conventional scenario in which a user is initially participating in a call through their car audio system which is interrupted by a handover to a new acoustic assembly in the user's house in the middle of the call.

In this scenario, the car audio system is a first acoustic assembly that has an established continuity with the user's mobile phone (not shown), which is receiving audio data from a third-party speaking on a remote device (also not shown). The car audio system renders audio received at the user's mobile phone that is transmitted by the user's phone over Bluetooth or another wireless connection to the user's car audio system.

However, when the user approaches their house and a signal of the new acoustic assembly (e.g., a home office speaker) is detected by the user's mobile phone, the user's phone hands over the call to the new acoustic assembly. This is an undesired result, as the user is still in the car. In fact, as shown in FIGS. 6 and 7, the user continues to speak "When is the meeting?" And the remote third-party entity responds "Hey Boss, the meeting is at 9." But, because of the handover to the home office speaker, the user in the car never hears that response. The following conversation continues in FIG. 7 with both participants unable to hear each other due to the call handover between the user's devices.

Figure 8:
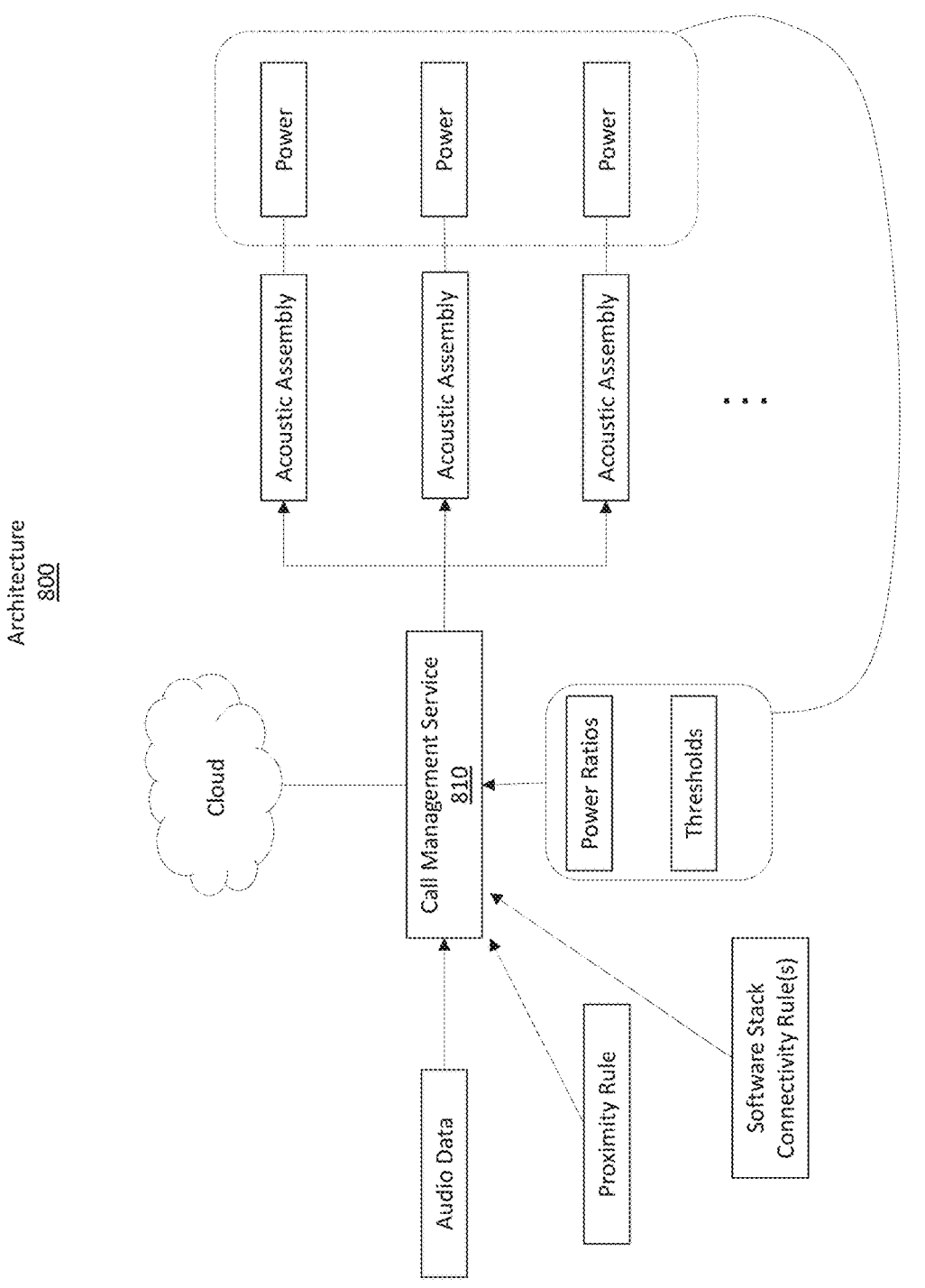
FIG. 8 illustrates an example architecture of a call management service for handling call handover events.

FIG. 8 illustrates a system architecture 800 for a call management service that implements the disclosed functionality. In this illustration, a call management service receives audio data during a call session (e.g., a phone call or conference) that is sent from one or more remote devices to a user device (e.g., a user mobile phone or computer). The call management service may be instantiated on the user device or an intermediary call management device interposed between the user device and the remote devices (not shown).

The call management service implements the connectivity rules described herein based on calculated power ratios for the different candidate handover acoustic assemblies. The call management service may also implement the connectivity rules in combination with and/or in response to the implementation of proximity rules that impose certain signal strength or distance proximity rules for handing over calls to new devices, as described.

The call management service may update its rules through systems connected through the cloud and/or the call management service may be implemented through the cloud with connectivity to the user's primary call device (e.g., the user's mobile phone), which may also be one of the candidate acoustic assemblies.

As described herein, the call management system detects power attributes of the different acoustic assemblies. This may be done through the cloud, such as when the acoustic assemblies are connected to the cloud, and/or through Bluetooth or other wireless connections when the user's device hosted on or connected with the call management service is within suitable distance to the acoustic assemblies to communicate over the Bluetooth or other wireless connections.

In some instances, the call management service queries the acoustic assemblies for their power metrics (e.g., generated/modulated current signals at a given time or over a period of time). The call management service may also query for other power attributes (e.g., current required or otherwise associated acoustic assemblies to render audio from the call) if it does not already have access to this information from available specifications available from resources in the cloud.

The call management service may query for the power metrics and/or other power attributes as soon as and/or whenever the call management service is able to communicate with the different acoustic assemblies, such as when the user's phone detects the Bluetooth signal or wireless communication signal from the acoustic assemblies.

The call management service uses these power metrics and other power attributes to calculate or otherwise determine the power ratios for the different acoustic assemblies. In some embodiments, the power ratio is calculated according to the following equation: $PR=|IA(t)|^2/|IB(t)|^2$, where IB(t) is a current associated with modulating the acoustic assembly to render audio of the call, and where IA(t) is the generated or modulated current resulting from ambient noise impacting speaker elements of the acoustic assembly, as previously described.

In this example, a lowpass filter can also be used to filter out insignificant or persistent noise (e.g., residual static) that is unrelated to a user's call and to generate ratios that are easier to distinguish based on newly detected ambient noises associated with the user's call.

In preferred embodiments, $|IA(t)|^2$ is a nonzero value and the different current values can be normalized between a value of 0 and 1.

Then, during the call, when a user (and the user's mobile phone) moves within radio proximity to new candidate acoustic assemblies, the system will compute the PRs (power ratios) for the new candidate acoustic assemblies to determine whether to handover the call to those new candidate acoustic assemblies based at least in part on the computed PRs.

For instance, if the PR for a candidate acoustic assembly is less than a predetermined handover threshold (e.g., 0.2, 0.3, 0.4, 0.5 or another a value between 0 and 1) then the system determines to refrain from making a handover the call to that new candidate acoustic assembly. However, if the PR for that candidate acoustic assembly is at or above the predetermined handover threshold then the system determines to handover the call to the new candidate acoustic system.

In some instances, the system also evaluates the power ratios against two different thresholds, s1 and s2, wherein s1 is the predetermined handover threshold and s2 is a lower threshold value than s1. In this implementation, when the power ratio of a candidate acoustic system reaches s2, prior to reaching s1, the system prompts the user with a prompt/query about whether the call should be handed over to the one or more candidate acoustic assemblies within proximity to the user (e.g., devices that are paired with the user's mobile phone and that are detectable by the user's mobile phone).

Then, based on user input received in response to the prompt/query, the call is maintained with the current acoustic assembly or, alternatively, is handed over to a selected new acoustic assembly.

Figure 9:
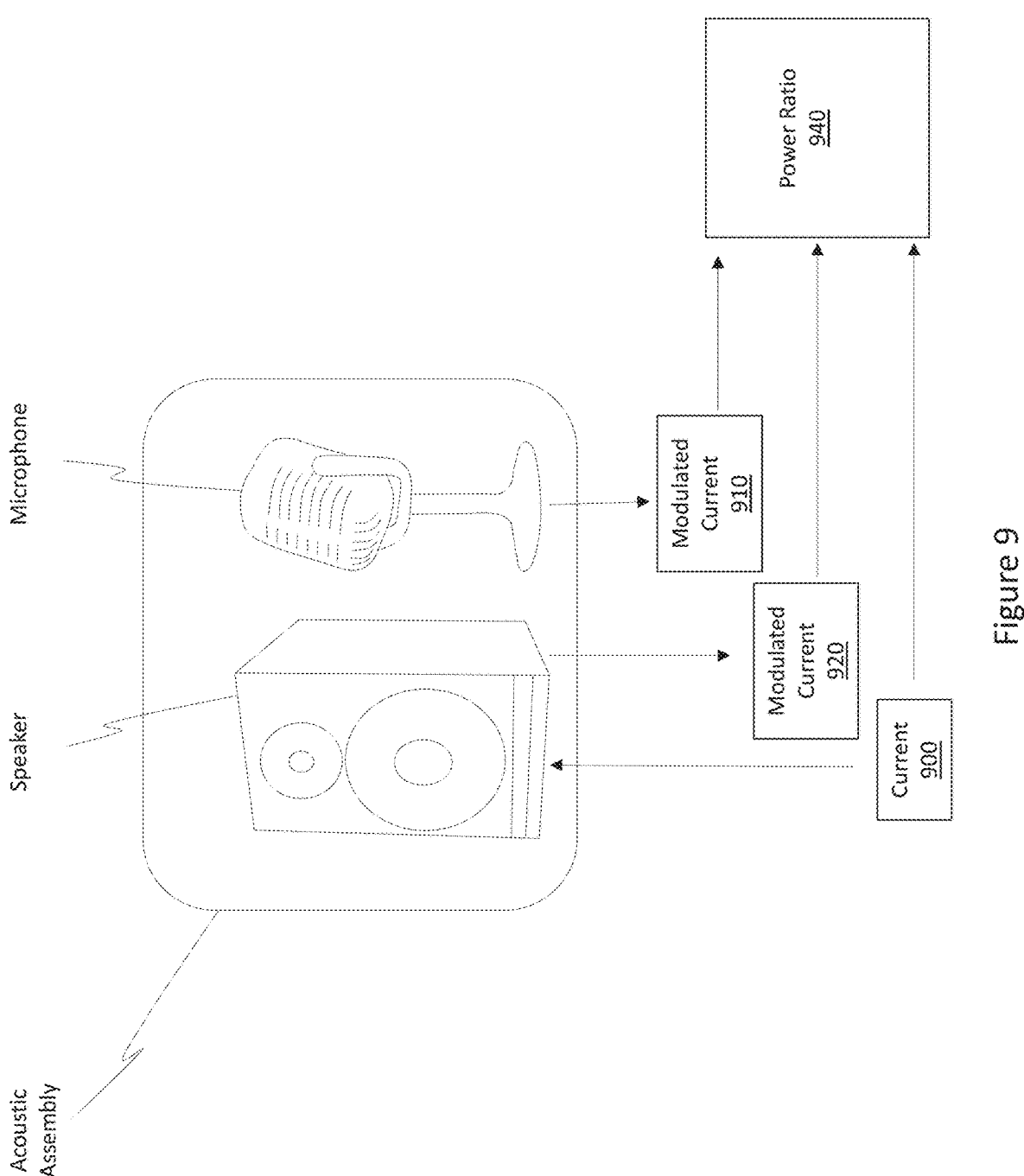
FIG. 9 illustrates sources of power elements used to calculate a power ratio for an acoustic assembly.

FIG. 9 illustrates how the current 900 required to generate audio at the speaker of an acoustic assembly can be considered along with the modulated current 910 that is modulated by audio received at a microphone and/or the modulated current 920 that is modulated by audio received at the speaker of the acoustic assembly to calculate the power ratio 940 described herein.

Figure 10:
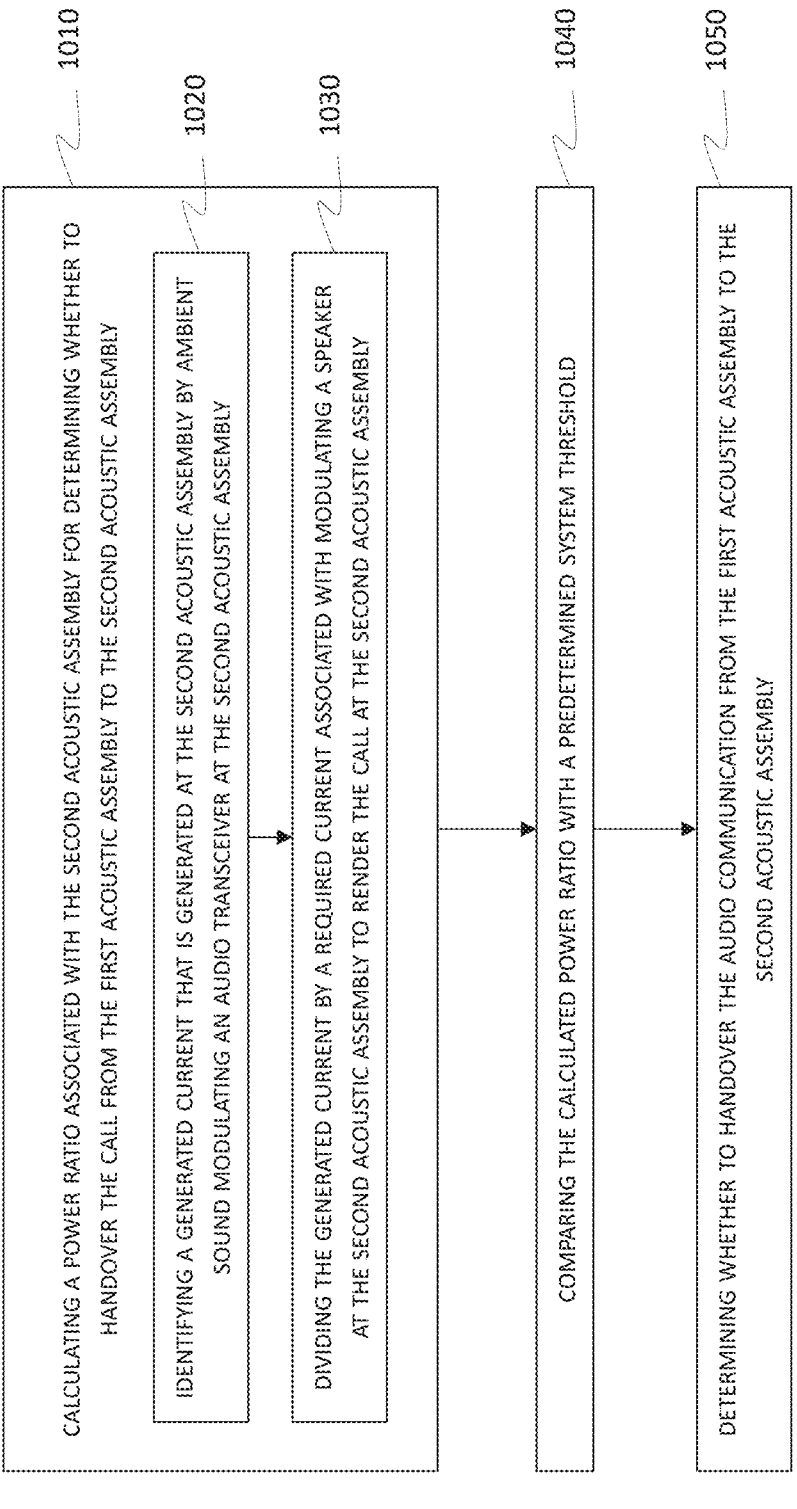

Attention is now directed to FIGS. 10 and 11, which illustrate related flowcharts 1000 and 1100, respectively, of acts that are associated with methods for managing speaker selection for calls during calling and conferencing. These methods may be implemented by a computing system such as a user mobile phone, a user computer or an intermediary system that hosts or executes code for the referenced call management service and which is responsible for enforcing or implementing the referenced handover rules during a call.

As shown in FIG. 10, the acts implemented by the computing system include calculating a power ratio associated with the second acoustic assembly for determining whether to handover the call from the first acoustic assembly to the second acoustic assembly (act 1010). This may occur, for example, during a call between a remote device and a first acoustic assembly.

The system calculates the power ratio by (i) identifying a generated current that is generated at the second acoustic assembly by ambient sound modulating an audio transceiver at the second acoustic assembly (act 1020), and (ii) dividing the generated current by a required current associated with modulating a speaker at the second acoustic assembly to render the call at the second acoustic assembly (act 1030), as previously described.

Then, the system compares the calculated power ratio with a predetermined system threshold (act 1040) and, based on the comparison, decides whether to handover the audio communication from the first acoustic assembly to the second acoustic assembly (act 1050). This act of deciding whether to handover the audio may also include refraining from triggering or allowing a handover of the call, or alternatively, triggering a handover of the call, such as by causing the user's mobile device to route the call communications through a Bluetooth signal to the second acoustic assembly.

In some instances, the first acoustic assembly is a first device paired with a mobile phone receiving the call from the remote device and the second acoustic assembly is a second device paired with the mobile phone. In other instances, the first acoustic assembly is a mobile phone receiving the call from the remote device and the second acoustic assembly is a device paired with the mobile phone.

In some instances, the act of determining whether to handover the call may also include prompting a user to select whether to handover the call from the first acoustic assembly to the second acoustic assembly when the power ratio is within a predetermined range between two thresholds.

FIG. 11 illustrates a related embodiment of a method for managing a handover of a call from a first state in which the call occurs between a remote device and a first device to second state in which the call occurs between the remote device and an acoustic assembly paired with the first device.

In this method, the acts implemented by the system include identifying an available acoustic assembly that is paired with the first device and that is within a proximity threshold to accept a handoff of the call from the first device to render audio output at the available acoustic assembly that is transmitted from the remote device to the first device during the call (act 1110).

The system also calculates the power ratio or detects the power ratio calculated by another system (e.g., the intermediary system disclosed herein), wherein the power ratio is associated with the available acoustic assembly, and wherein the power ratio is detected and/or calculated by the system prior to handing off the call from the first device to the available acoustic assembly (act 1120).

As before, the power ratio is a ratio of (i) power associated with ambient noise modulating electric current at the available acoustic assembly and (ii) power associated with current for modulating the acoustic assembly to render audio output corresponding to audio data transmitted from the remote device.

Then, the system will either refrain from handing off the call from the first device to the available acoustic assembly until it is determined that the power ratio is above a particular handoff threshold (act 1130) and/or trigger the handing off the call from the first device to the available acoustic assembly in response to determining that the power ratio is above the particular handoff threshold (act 1140). The handing off can be triggered by at least causing the audio data transmitted to the first device from the remote device to be routed from the first device to the available acoustic assembly, such as through a Bluetooth channel established between the first device and the available acoustic assembly.

In some instances, the method may also include the system determining whether the power ratio is above a notification threshold and below the particular handoff threshold; and upon determining the power ratio is above the notification threshold and below the particular handoff threshold, providing the user a query prompt about whether the call should be handed off from the first device to the available acoustic assembly.

In some instances, the method may further include handing the call off from the first device to the available acoustic assembly in response to receiving a user input responsive to the query prompt.

In these embodiments, the first device may be a user's mobile phone and the available acoustic assembly may be a speaker, such as a Bluetooth enabled speaker paired with the user's mobile phone.

In some instances, the particular handoff threshold is an adjustable threshold that a user may adjust by providing input at their mobile phone in response to a query transmitted to the user for selecting or adjusting the particular handoff threshold.

The references to detecting and/or calculating the power ratio may also further comprise detecting or calculating a change in the power ratio over a predetermined time, such as over a few seconds or less than a minute from a time when the user's mobile phone detects the Bluetooth signal from the available acoustic assembly.

In such instances, the handing off of the call from the first device to the available acoustic assembly will only occur upon determining the change in the power ratio over the predetermined time comprises an increase in the power ratio, either a simple increase or an increase of at least a predetermined percentage (e.g., an increase of at least 5%, 10% or more than 10%). This can help increase the likelihood that the user has entered audible proximity to the available acoustic assembly.

In some embodiments, the disclosed method also includes (i) determining whether the power ratio has been calculated to be above a first threshold and below the particular handoff threshold for a predetermined duration of time, and (ii) only upon determining the power ratio has been calculated to be above a first threshold and below the particular handoff threshold for the predetermined duration of time, providing the user a query prompt about whether the call should be handed off from the first device to the available acoustic assembly.

The system will also refrain from handing off the call from the first device to the available acoustic assembly until it is determined that the power ratio has remained above the particular handoff threshold for a predetermined duration of time and/or until the user has responded to the query prompt to handover the call to the available acoustic assembly.

In some instances, the system is configured to receive a signal from a first audio device (e.g., a user's mobile phone) and a second audio device (e.g., a speaker) and calculate a power ratio based on the received signals, wherein the power ratio is a current being modulated by audio at the second audio device divided by a current associated with modulating audio at the second audio device. The system will then compare the calculated power ratio with a predetermined system threshold and, based on the comparison, determine when to handover the audio communication from the first audio device to the second audio device.

The system may also prompt the user to confirm that the handover should occur prior to handing over the audio communication to the second audio device. This prompt may be generated in response to the system determining that the calculated power ratio is at least as great as the predetermined system threshold.

The system implementing the disclosed methods may be any computing system having a processor and stored computer-executable instructions that are executable by the computing system to cause the computing system to implement the disclosed method functionality. Exemplary computing systems that are capable of implementing the disclosed methods will now be described in more detail.

Example Computer/Computer Systems

Figure 12:
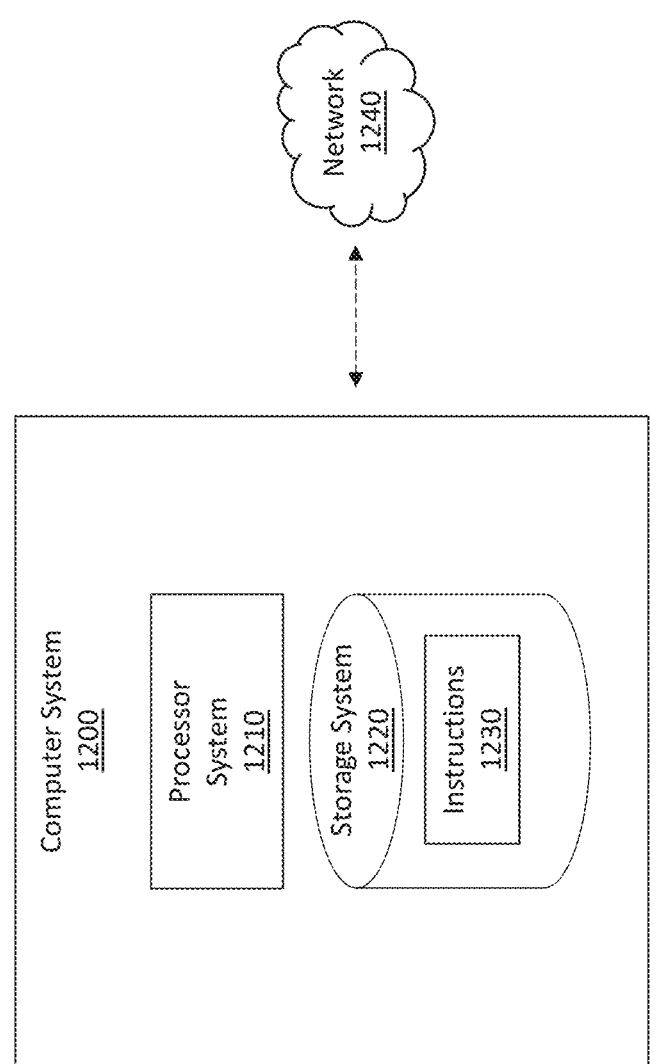
FIG. 12 illustrates an example of a computer system that may be used or incorporated into the disclosed and claimed embodiments.

FIG. 12 illustrates an example computer system 1200 that may comprise the user device 100 or intermediary system 115, for example, and that are configured to host or execute the call management service 810.

Computer system 1200 may take various different forms. For example, computer system 1200 may be embodied as a tablet, a desktop, a laptop, a mobile device, or a standalone device, such as those described throughout this disclosure. Computer system 1200 may also be a distributed system that includes one or more connected computing components/ devices that are in communication with computer system 1200.

In its most basic configuration, computer system 1200 includes various different components. FIG. 12 shows that computer system 1200 includes a processor system 1210 that includes one or more processor(s) (aka a "hardware processing unit") and a storage system 1220.

Regarding the processor(s), it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1200. The different components, modules, engines, and services described herein may be implemented as objects or processors that execute on computer system 1200 (e.g. as separate threads).

Storage system 1220 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

Storage system 1220 is shown as including executable instructions 1230. The executable instructions 1230 represent instructions that are executable by the processor(s) the processor system 1210 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices via a network 1240. For example, computer system 1200 can communicate with any number devices or cloud services to obtain or process data. In some cases, network 1240 may itself be a cloud network. Furthermore, computer system 1200 may also be connected through one or more wired or wireless networks to remote/ separate computer systems(s) that are configured to perform any of the processing described with regard to computer system 1200.

A "network," like network 1240, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1240. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Numbered Clauses

The present invention can also be described in accordance with the following numbered clauses.

Clause 1. A method for managing audio device handover in a communication system, the method comprising: during a call between a remote device and a first acoustic assembly, calculating a power ratio associated with a second acoustic assembly for determining whether to handover the call from the first acoustic assembly to the second acoustic assembly; the power ratio being calculated by (i) identifying a generated current that is generated at the second acoustic assembly by ambient sound modulating an audio transceiver at the second acoustic assembly, and (ii) dividing the generated current by a required current associated with modulating a speaker at the second acoustic assembly to render the call at the second acoustic assembly; comparing the calculated power ratio with a predetermined system threshold; and based on the comparison, deciding whether to handover the audio communication from the first acoustic assembly to the second acoustic assembly.

Clause 2. The method of clause 1, wherein the first acoustic assembly is a first device paired with a mobile phone receiving the call from the remote device and the second acoustic assembly is a second device paired with the mobile phone.

Clause 3. The method of clause 1, wherein the first acoustic assembly is a mobile phone receiving the call from the remote device and the second acoustic assembly is a device paired with the mobile phone.

Clause 4. The method of clause 1, further comprising prompting a user to select whether to handover the call from the first acoustic assembly to the second acoustic assembly when the power ratio is within a predetermined range between two thresholds.

Clause 5. A method implemented by a computing system managing a handover of a call from a first state in which the call occurs between a remote device and a first device to second state in which the call occurs between the remote device and an acoustic assembly paired with the first device, the method comprising: identifying an available acoustic assembly that is paired with the first device and that is within a proximity threshold to accept a handoff of the call from the first device to render audio output at the available acoustic assembly that is transmitted from the remote device to the first device during the call; prior to handing off the call from the first device to the available acoustic assembly, detecting a power ratio of (i) power associated with ambient noise modulating electric current at the available acoustic assembly and (ii) power associated with current for modulating the acoustic assembly to render audio output corresponding to audio data transmitted from the remote device; refraining from handing off the call from the first device to the available acoustic assembly until it is determined that the power ratio is above a particular handoff threshold; and handing off the call from the first device to the available acoustic assembly in response to determining that the power ratio is above the particular handoff threshold and by at least causing the audio data transmitted to the first device from the remote device to be routed from the first device to the available acoustic assembly.

Clause 6. The method of clause 5, wherein the method further includes: determining whether the power ratio is above a notification threshold and below the particular handoff threshold; and upon determining the power ratio is above the notification threshold and below the particular handoff threshold, providing the user a query prompt about whether the call should be handed off from the first device to the available acoustic assembly.

Clause 7. The method of clause 6, wherein the method further includes handing the call off from the first device to the available acoustic assembly in response to receiving a user input responsive to the query prompt.

Clause 8. The method of clause 6, wherein the first device is a mobile phone and the available acoustic assembly is a speaker.

Clause 9. The method of clause 6, wherein the particular handoff threshold is an adjustable threshold.

Clause 10. The method of clause 9, wherein the method further includes receiving input from the user for adjusting the threshold.

Clause 11. The method of clause 5, wherein the detecting the power ratio further comprises detecting a change in the power ratio over a predetermined time.

Clause 12. The method of clause 11, wherein handing off the call from the first device to the available acoustic assembly only occurs upon determining the change in the power ratio over the predetermined time comprises an increase in the power ratio of at least a predetermined percentage.

Clause 13. The method of clause 12, wherein the predetermined time comprises a period of less than a minute.

Clause 14. The method of clause 13, wherein the change in the power ratio over the predetermined time comprises an increase in the power ratio of at least 5%.

Clause 15. The method of clause 12, wherein the change in the power ratio over the predetermined time comprises an increase in the power ratio of at least 10%.

Clause 16. The method of clause 5, wherein the method further includes: determining whether the power ratio has been calculated to be above a first threshold and below the particular handoff threshold for a predetermined duration of time; and upon determining the power ratio has been calculated to be above a first threshold and below the particular handoff threshold for the predetermined duration of time, providing the user a query prompt about whether the call should be handed off from the first device to the available acoustic assembly.

Clause 17. The method of clause 5, wherein the method further includes refraining from handing off the call from the first device to the available acoustic assembly until it is determined that the power ratio has remained above the particular handoff threshold for a predetermined duration of time.

Clause 18. A system for managing audio device handover in a communication system, the system comprising: one or more processors; and one or more hardware storage devices having stored computer-executable instructions that are executable by the one or more processors for causing the system to perform the following: receive a signal from a first audio device and a second audio device; calculate a power ratio based on the received signals, wherein the power ratio is a current being modulated by audio at the second audio device divided by a current associated with modulating audio at the second audio device; compare the calculated power ratio with a predetermined system threshold; and based on the comparison, determine when to handover the audio communication from the first audio device to the second audio device.

Clause 19. The system of clause 18, wherein the first audio device is a mobile phone and the second audio device is a speaker.

Clause 20. The system of clause 18, further comprising: prior to handing over the audio communication to the second audio device, prompting the user to confirm that the handover should occur and wherein the system prompts the user to confirm that the handover should occur upon determining that the calculated power ratio is at least as great as the predetermined system threshold.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method for managing audio device handover in a communication system, the method comprising:

during a call between a remote device and a first acoustic assembly, calculating a power ratio associated with a second acoustic assembly for determining whether to handover the call from the first acoustic assembly to the second acoustic assembly;

the power ratio being calculated by (i) identifying a generated current that is generated at the second acoustic assembly by ambient sound modulating an audio transceiver at the second acoustic assembly, and (ii) dividing the generated current by a required current associated with modulating a speaker at the second acoustic assembly to render the call at the second acoustic assembly;

comparing the calculated power ratio with a predetermined system threshold; and based on the comparison, deciding whether to handover the audio communication from the first acoustic assembly to the second acoustic assembly.

2. The method of claim 1, wherein the first acoustic assembly is a first device paired with a mobile phone receiving the call from the remote device and the second acoustic assembly is a second device paired with the mobile phone.

3. The method of claim 1, wherein the first acoustic assembly is a mobile phone receiving the call from the remote device and the second acoustic assembly is a device paired with the mobile phone.

4. The method of claim 1, further comprising prompting a user to select whether to handover the call from the first acoustic assembly to the second acoustic assembly when the power ratio is within a predetermined range between two thresholds.

5. A method implemented by a computing system managing a handover of a call from a first state in which the call occurs between a remote device and a first device to second state in which the call occurs between the remote device and an acoustic assembly paired with the first device, the method comprising:

identifying an available acoustic assembly that is paired with the first device and that is within a proximity threshold to accept a handoff of the call from the first device to render audio output at the available acoustic assembly that is transmitted from the remote device to the first device during the call;

prior to handing off the call from the first device to the available acoustic assembly, detecting a power ratio of (i) power associated with ambient noise modulating electric current at the available acoustic assembly and (ii) power associated with current for modulating the acoustic assembly to render audio output corresponding to audio data transmitted from the remote device;

refraining from handing off the call from the first device to the available acoustic assembly until it is determined that the power ratio is above a particular handoff threshold; and handing off the call from the first device to the available acoustic assembly in response to determining that the power ratio is above the particular handoff threshold and by at least causing the audio data transmitted to the first device from the remote device to be routed from the first device to the available acoustic assembly.

6. The method of claim 5, wherein the method further includes:

determining whether the power ratio is above a notification threshold and below the particular handoff threshold; and upon determining the power ratio is above the notification threshold and below the particular handoff threshold, providing a user a query prompt about whether the call should be handed off from the first device to the available acoustic assembly.

7. The method of claim 6, wherein the method further includes handing the call off from the first device to the available acoustic assembly in response to receiving a user input responsive to the query prompt.

8. The method of claim 6, wherein the first device is a mobile phone and the available acoustic assembly is a speaker.

9. The method of claim 6, wherein the particular handoff threshold is an adjustable threshold.

10. The method of claim 9, wherein the method further includes receiving input from the user for adjusting the threshold.

11. The method of claim 5, wherein the detecting the power ratio further comprises detecting a change in the power ratio over a predetermined time.

12. The method of claim 11, wherein handing off the call from the first device to the available acoustic assembly only occurs upon determining the change in the power ratio over the predetermined time comprises an increase in the power ratio of at least a predetermined percentage.

13. The method of claim 12, wherein the predetermined time comprises a period of less than a minute.

14. The method of claim 13, wherein the change in the power ratio over the predetermined time comprises an increase in the power ratio of at least 5%.

15. The method of claim 12, wherein the change in the power ratio over the predetermined time comprises an increase in the power ratio of at least 10%.

16. The method of claim 5, wherein the method further includes:

determining whether the power ratio has been calculated to be above a first threshold and below the particular handoff threshold for a predetermined duration of time; and upon determining the power ratio has been calculated to be above a first threshold and below the particular handoff threshold for the predetermined duration of time, providing a user a query prompt about whether the call should be handed off from the first device to the available acoustic assembly.

17. The method of claim 5, wherein the method further includes refraining from handing off the call from the first device to the available acoustic assembly until it is determined that the power ratio has remained above the particular handoff threshold for a predetermined duration of time.

18. A system for managing audio device handover in a communication system, the system comprising:

one or more processors; and one or more hardware storage devices having stored computer-executable instructions that are executable by the one or more processors for causing the system to perform the following:

receive a signal from a first audio device and a second audio device;

calculate a power ratio based on the received signals, wherein the power ratio is a current being modulated by audio at the second audio device divided by a current associated with modulating audio at the second audio device;

compare the calculated power ratio with a predetermined system threshold; and based on the comparison, determine when to handover the audio communication from the first audio device to the second audio device.

19. The system of claim 18, wherein the first audio device is a mobile phone and the second audio device is a speaker.

20. The system of claim 18, further comprising: prior to handing over the audio communication to the second audio device, prompting the user to confirm that the handover should occur and wherein the system prompts a user to confirm that the handover should occur upon determining that the calculated power ratio is at least as great as the predetermined system threshold.

* * * * *